US010880284B1

(12) United States Patent
Hitchcock et al.

(10) Patent No.: US 10,880,284 B1
(45) Date of Patent: Dec. 29, 2020

(54) REPURPOSING LIMITED FUNCTIONALITY DEVICES AS AUTHENTICATION FACTORS

(71) Applicant: Amazon Technologies, Inc., Seattle, WA (US)

(72) Inventors: Daniel Wade Hitchcock, Bothell, WA (US); Bharath Kumar Bhimanaik, Sammamish, WA (US); Robert Ellis Lee, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 707 days.

(21) Appl. No.: 15/241,908

(22) Filed: Aug. 19, 2016

(51) Int. Cl.
*H04L 29/06* (2006.01)

(52) U.S. Cl.
CPC ............ *H04L 63/08* (2013.01); *H04L 63/102* (2013.01); *H04L 63/0815* (2013.01); *H04L 63/10* (2013.01)

(58) Field of Classification Search
CPC ... H04L 63/08; H04L 63/102; H04L 63/0815; H04L 63/10
USPC .......................................................... 726/7
See application file for complete search history.

(56) References Cited

U.S. PATENT DOCUMENTS

| 7,716,096 | B2* | 5/2010 | Drummond | H04L 67/28 |
| | | | | 705/35 |
| 8,654,936 | B1* | 2/2014 | Eslambolchi | H04L 12/2818 |
| | | | | 379/88.04 |
| 9,262,612 | B2* | 2/2016 | Cheyer | G06F 21/32 |
| 9,304,736 | B1* | 4/2016 | Whiteley | G06Q 20/40145 |
| 9,721,586 | B1* | 8/2017 | Bay | H04R 1/345 |
| 9,820,315 | B2* | 11/2017 | Le Guen | H04W 4/70 |
| 2003/0159044 | A1* | 8/2003 | Doyle | G06F 21/32 |
| | | | | 713/176 |
| 2003/0177012 | A1* | 9/2003 | Drennan | G10L 15/26 |
| | | | | 704/275 |
| 2004/0003073 | A1* | 1/2004 | Krzyzanowski | H04L 67/025 |
| | | | | 709/223 |
| 2004/0215750 | A1* | 10/2004 | Stilp | G08B 25/10 |
| | | | | 709/220 |

(Continued)

OTHER PUBLICATIONS

U.S. Appl. No. 15/189,493, entitled "Distributing Variable Entropy Ephemeral Security Credentials Across Channels of Variable Assurance," filed Jun. 22, 2016.

(Continued)

*Primary Examiner* — Shahriar Zarrineh
(74) *Attorney, Agent, or Firm* — Thomas | Horstemeyer, LLP (57) ABSTRACT

Disclosed are various embodiments for repurposing limited-functionality networked devices as authentication factors. In one embodiment, an authentication service identifies a limited-functionality networked device associated with an account and communicatively coupled to the network. The limited-functionality networked device is configured to perform a first function upon a predefined user interaction. The service configures the limited-functionality networked device to perform a second function based at least in part on the predefined user interaction. The service determines that the predefined user interaction has been performed by a user with respect to the limited-functionality networked device. The service authenticates the user at a client device for access to the account based at least in part on the predefined user interaction having been performed.

20 Claims, 5 Drawing Sheets

(56) References Cited

U.S. PATENT DOCUMENTS

| | | | | |
|---|---|---|---|---|
| 2005/0027871 | A1* | 2/2005 | Bradley | G06F 16/951 709/227 |
| 2005/0195691 | A1* | 9/2005 | Arnold | G04F 5/025 368/82 |
| 2006/0154642 | A1* | 7/2006 | Scannell | A01G 9/02 455/404.1 |
| 2007/0012793 | A1* | 1/2007 | Flood | F23N 5/20 236/51 |
| 2007/0150603 | A1* | 6/2007 | Crull | G06F 21/335 709/227 |
| 2008/0221715 | A1* | 9/2008 | Krzyzanowski | H04L 12/2838 700/90 |
| 2009/0265776 | A1* | 10/2009 | Baentsch | H04L 63/08 726/9 |
| 2009/0271002 | A1* | 10/2009 | Asofsky | G05B 15/02 700/3 |
| 2012/0079513 | A1* | 3/2012 | Nahata | H04N 21/2225 725/5 |
| 2013/0243180 | A1* | 9/2013 | Williams | G06Q 10/02 379/266.01 |
| 2013/0297078 | A1* | 11/2013 | Kolavennu | G05D 23/1917 700/276 |
| 2014/0070959 | A1* | 3/2014 | Bhargava | H04Q 9/00 340/870.07 |
| 2014/0136195 | A1* | 5/2014 | Abdossalami | G10L 15/26 704/235 |
| 2014/0309864 | A1* | 10/2014 | Ricci | H04W 4/21 701/36 |
| 2014/0330560 | A1* | 11/2014 | Venkatesha | G06F 21/32 704/235 |
| 2015/0053781 | A1* | 2/2015 | Nelson | F24F 11/30 236/1 C |
| 2015/0058447 | A1* | 2/2015 | Albisu | H04L 67/02 709/219 |
| 2015/0066609 | A1* | 3/2015 | Steele | G06Q 30/0207 705/14.1 |
| 2015/0150101 | A1* | 5/2015 | Novack | G07C 9/00111 726/7 |
| 2015/0156631 | A1* | 6/2015 | Ramachandran | H04W 4/70 455/411 |
| 2015/0161370 | A1* | 6/2015 | North | G07C 9/00158 726/5 |
| 2015/0162006 | A1* | 6/2015 | Kummer | G07C 9/00571 704/275 |
| 2015/0170665 | A1 | 6/2015 | Gundeti et al. | |
| 2015/0213355 | A1* | 7/2015 | Sharma | G06N 3/006 706/11 |
| 2015/0242918 | A1* | 8/2015 | McCarthy | G06Q 30/0617 705/26.43 |
| 2015/0346701 | A1* | 12/2015 | Gordon | G05B 15/02 700/275 |
| 2015/0347734 | A1* | 12/2015 | Beigi | G06F 21/32 713/155 |
| 2016/0021105 | A1* | 1/2016 | Pellom | H04L 63/0861 726/7 |
| 2016/0034410 | A1* | 2/2016 | Oh | G06F 13/385 710/12 |
| 2016/0042748 | A1 | 2/2016 | Jain et al. | |
| 2016/0050209 | A1* | 2/2016 | Govande | H04L 63/101 726/7 |
| 2016/0165387 | A1* | 6/2016 | Nhu | H04L 67/10 455/41.1 |
| 2016/0226823 | A1* | 8/2016 | Ansari | G05B 19/042 |
| 2016/0231549 | A1* | 8/2016 | Bosworth | G02B 21/008 |
| 2016/0241660 | A1* | 8/2016 | Nhu | H04W 4/80 |
| 2017/0124842 | A1* | 5/2017 | Sinha | G05B 19/048 |
| 2017/0188437 | A1* | 6/2017 | Banta | H05B 37/0236 |
| 2018/0014189 | A1* | 1/2018 | Ellison | H04W 12/06 |
| 2018/0131571 | A1* | 5/2018 | Ansari | G06F 16/64 |

OTHER PUBLICATIONS

U.S. Appl. No. 14/802,773, entitled "Printed Material With an Embedded Ordering Device," filed Jul. 17, 2015.

* cited by examiner

REPURPOSING LIMITED FUNCTIONALITY DEVICES AS AUTHENTICATION FACTORS

BACKGROUND

In years past, primarily only general-purpose computing systems were connected to the Internet. Such computing systems may encompass desktop computers, laptop computers, tablet computers, mobile phones, and so on. However, the concept of the Internet of Things (IoT) is becoming more and more widespread. With IoT, nearly every device in a home, office, or other environment can be network enabled. For example, an IoT-enabled home may include Internet-enabled kitchen appliances, electrical switches and receptacles, thermostats, door sensors, window sensors, motion sensors, televisions, audio speakers, and many other devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to repurposing limited functionality devices as authentication factors. With popularization of the Internet of Things (IoT), people are being surrounded by more and more network-enabled devices. In addition to general-purpose computing devices that have been network connected for some time, special-purpose computing devices are now being integrated into virtually any device around the home or office. By reducing cost, size, and power consumption of networking technology, devices for which network connection was not thought to be worthwhile are now being connected. For example, every light switch in an environment may be network connected in order to manage power profiles (e.g., to ensure that all lights are turned off at night). Also, new limited functionality devices have been created, such as buttons that when selected cause a particular product to be ordered.

Multi-factor authentication is also becoming more popular. Previously, many authentication systems were based on a single factor, such as knowledge of a shared secret like a password. However, it has been recognized that shared secrets such as passwords can be susceptible to compromise. For instance, users may set an easily guessed password or may reuse a single password across multiple accounts. To increase security assurance for authentication systems, a combination of factors may be relied upon. Additional knowledge-based questions can be asked (knowledge factors), one-time passwords generated by hardware or software tokens can be requested (possession factors), or some unique aspect of the user can be scanned (biometric factors), among other examples. In other words, multi-factor authentication can assess what the user knows, what the user has, and who the user is.

Various embodiments of the present disclosure introduce the concept of leveraging IoT devices as authentication factors in multi-factor authentication. IoT devices typically are special-purpose devices with limited functionality. For instance, an IoT-enabled light switch may be a conventional-looking toggle switch that simply turns a light fixture on or off, where the current status of the switch can be reported via a network and the switching mechanism can be controlled remotely via the network. The light switch may not have a dedicated/integrated display, a keyboard, a speaker, or other conventional input devices or output devices. Nonetheless, as will be described herein, the light switch can be configured as a trusted device for an authentication service, and activating the light switch can be regarded as a possession-based authentication factor. As discussed herein, limited functionality networked devices can be repurposed as authentication factors, since authentication of users was not an original design purpose of such devices.

In further embodiments of the present disclosure, non-networked limited-functionality devices or objects may be repurposed as authentication factors. In this regard, a user may be directed to interact with a limited-functionality device with respect to a capture device including a camera, a microphone, or other input devices. As an example, a user may be directed to play notes on a piano, where the audio may be captured by the capture device. The resulting sounds can be compared with what would be expected given a profile of the user's piano. As another example, a user may be directed to show a given object in front of a camera. The resulting images can be compared to images of the object associated with the user account.

Figure 1:
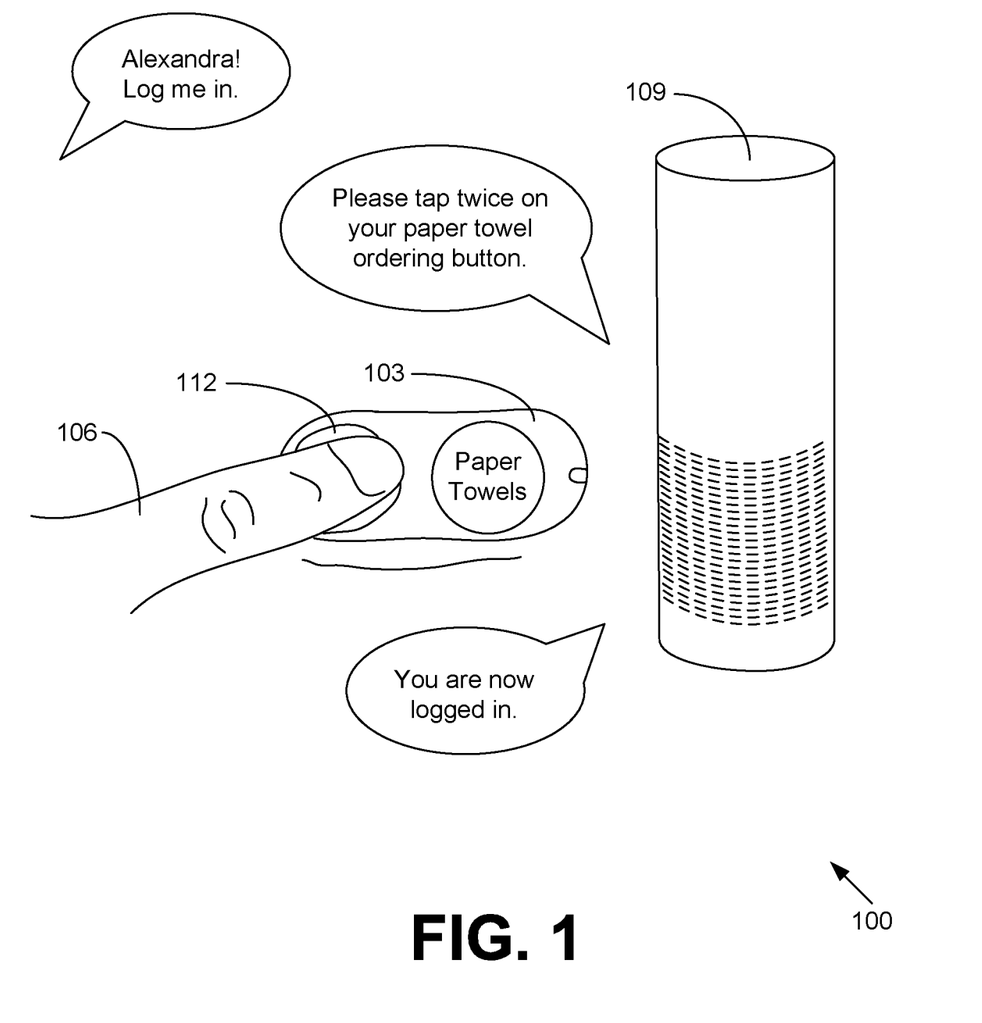
FIG. 1 a drawing of an example scenario involving the usage of a limited-functionality networked device as an authentication factor.

Referring to FIG. 1, shown is a drawing of an example scenario 100 involving the usage of a limited-functionality networked device 103 as an authentication factor. In this example, a user 106 requests authentication for an account by interacting with a voice interface device 109. Specifically, the user 106 speaks a wake word ("Alexandra") followed by a voice command ("log me in"). A microphone of the voice interface device 109 picks up the audio. Upon detecting the wake word, the voice interface device 109 enters an active listening mode and initiates speech processing on the following voice command. The voice command here corresponds to an authentication request. Once logged in or authenticated, the user 106 may be able to access resources or perform functions that are restricted to authorized users of the account.

Although voice recognition may be performed in order to identify the speaker, other authentication factors may be required in order to confirm the user's identity. For instance, the user 106 may be required to supply a passphrase, answer a knowledge-based question, provide a one-time password from a hardware token, and so on. Of specific interest to the present disclosure, however, the user 106 may be asked to perform one or more functions relative to one or more limited-functionality networked devices 103.

In the non-limiting example of FIG. 1, the voice interface device 109 prompts the user 106 to "tap twice on your paper towel ordering button." The limited-functionality networked device 103 in this example is a special-purpose device that has the sole purpose of placing an order for paper towels. With the normal functionality of the limited-functionality networked device 103, the user 106 taps on a button 112 of the limited-functionality networked device 103. The limited-functionality networked device 103 then communicates with a network service to indicate that the order should be placed for the user 106 for the paper towels. A light-emitting diode or other indicator on the limited-functionality networked device 103 may then be activated as a confirmation.

The limited-functionality networked device 103 as discussed herein may be repurposed as an authentication factor. Typically, the user 106 would have access to the limited-functionality networked device 103, and the limited-functionality networked device 103 would be secured or otherwise be in an environment that limits access to other users (e.g., an environment such as a home, a private vehicle, an office, or carried by the user 106). Thus, the limited-functionality networked device 103 can act as a possession authentication factor.

Nonetheless, the normal consequence of activating the functionality may be suspended or reversed. In this case, no actual order for paper towels may be placed due to the sequence of two taps, or the system may be configured to cancel any orders resulting from activating the limited-functionality networked device 103 when directed to for authentication purposes. When the system is notified that the activation has occurred, the voice interface device 109 can respond with "you are now logged in," or another indication that authentication has succeeded. In the following discussion, a general description of the system and its components is provided, followed by a discussion of the operation of the same.

Figure 2:
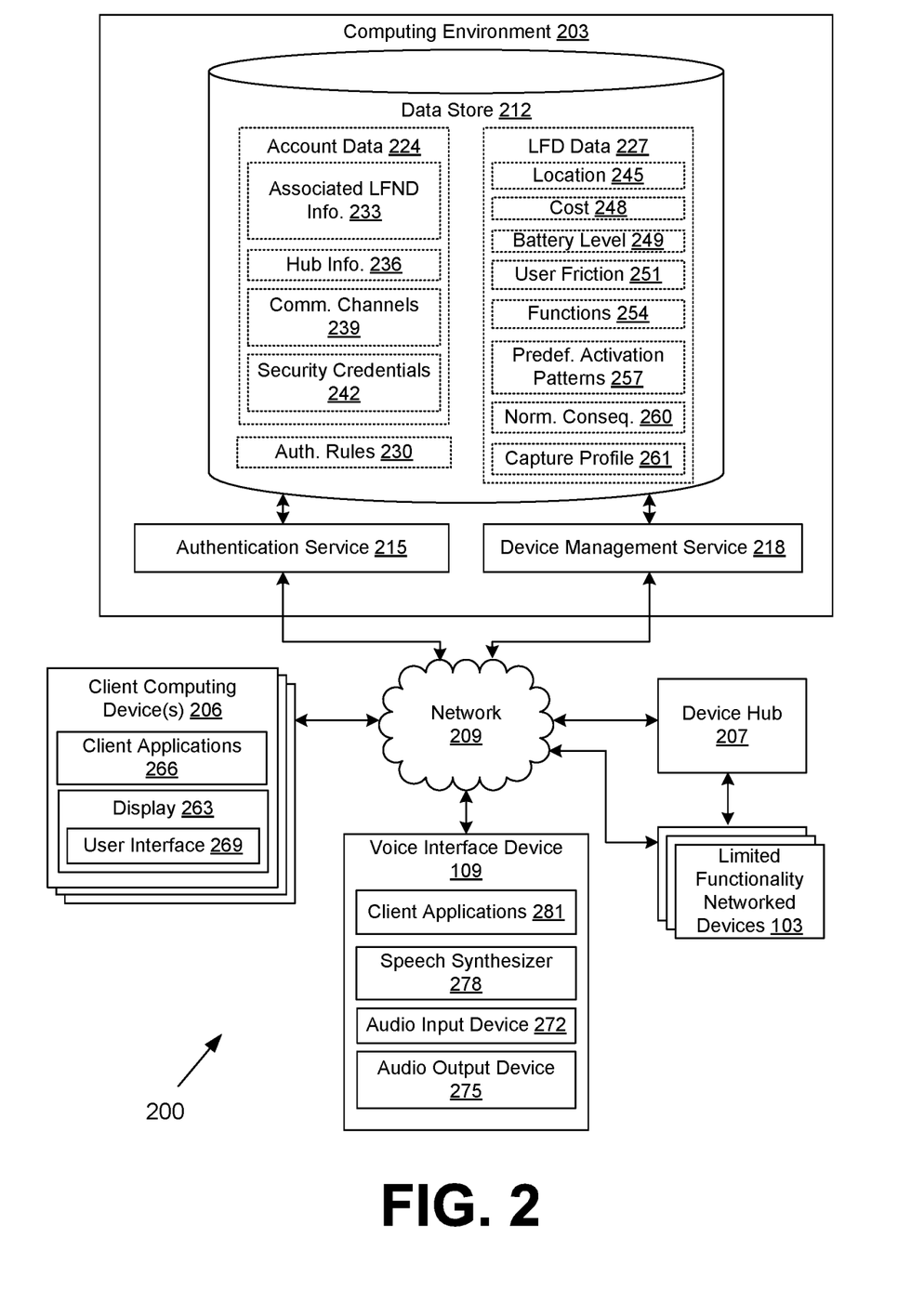
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client computing devices 206, one or more device hubs 207, one or more voice interface devices 109, and one or more limited-functionality networked devices 103, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The limited-functionality networked devices 103 may be in direct communication with the computing environment 203 via the network 209, or the limited-functionality networked devices 103 may be in communication with the computing environment 203 via a device hub 207 and/or one or more intermediate other limited-functionality networked devices 103. The device hub 207 may support Z-WAVE, ZIGBEE, X10, BLUETOOTH, ENOCEAN, and/or other networking technologies.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an authentication service 215, a device management service 218, and other applications, services, processes, systems, engines, or functionality not discussed in detail herein. The authentication service 215 is executed to authenticate users for access to resources associated with accounts. Such resources may be secured or protected such that the identities of the users must be confirmed before access to the resources is granted. The authentication service 215 may require multi-factor authentication and may select from among a variety of authentication factors, which may include shared secrets (e.g., passwords, numerical codes, etc.), hardware tokens or software tokens, biometric factors (e.g., voice recognition, fingerprint identification, iris scanning, etc.), answers to knowledge-based questions, and access to one or more limited-functionality networked devices 103. The authentication service 215 may communicate with the device management service 218 to receive notifications that functionality of the limited-functionality networked devices 103 has been activated as well as to temporarily disable, suspend, reverse, or otherwise prevent the realization of the normal consequences of the functions of the limited-functionality networked devices 103.

In various embodiments, activation of a limited-functionality networked device 103 may cause information corresponding to an ephemeral security credential (or portion thereof) to be provided to the user via a trusted channel of communication. For instance, where activation of a limited-functionality networked device 103 normally causes the ordering of an item, the order for the item and a price may be shown in a user's account history. The user can then be directed to log in to view the account history, and see a code (e.g., a combination of an order number and price). The user can then provide the code to the authentication service 215 via a client computing device 206 or other device to confirm that (1) the limited-functionality networked device 103 was activated, and (2) the user has access to the account history. The combination of the two may be seen to increase authentication assurance over one alone. Since the limited-functionality networked device 103 was activated for authentication purposes, the order will not actually be fulfilled. Various approaches to distributing ephemeral security credentials are described in U.S. patent application Ser. No. 15/189,493, entitled "DISTRIBUTING VARIABLE ENTROPY EPHEMERAL SECURITY CREDENTIALS ACROSS CHANNELS OF VARIABLE ASSURANCE," filed on Jun. 22, 2016, which is incorporated by reference herein in its entirety.

The device management service 218 may provide back-end functionality for one or more of the limited-functionality networked devices 103. In this regard, the device management service 218 may receive communications from the limited-functionality networked devices 103 and carry out some action or normal consequence in response to the communications. For instance, the device management service 218 may receive a notification that a button 112 (FIG. 1) of an item ordering device has been activated. In response, the device management service 218 may initiate processes to place an order for a particular item, using a preconfigured payment instrument, a preconfigured address, a preconfigured delivery preference, and/or other parameters to control the automated placement of orders. The device management service 218 may be configured to notify that authentication service 215 of locations of the limited-functionality networked devices 103 or that functions of the limited-functionality networked devices 103 have been activated and characteristics associated therewith. Although the device management service 218 is described in the singular, it is understood that there may be many different device management services 218 that are operated by different providers and/or correspond to different types of limited-functionality networked devices 103.

The data stored in the data store 212 includes, for example, account data 224, limited-functionality device (LFD) data 227, authentication rules 230, and potentially other data. The account data 224 includes a variety of data associated with user accounts, including associated LFD information 233, hub information 236, communication channels 239, security credentials 242, secured resources, and/or other data. The associated LFD information 233 identifies one or more limited-functionality networked devices 103 that are associated with the user account. These limited-functionality networked devices 103 may be specified manually by a user or may be discovered automatically through an automated discovery procedure. The associated LFD information 233 may include credentials and/or other information necessary to communicate with and/or gain access to the limited-functionality networked devices 103 and/or the device management service 218 that manages the limited-functionality networked devices 103.

The hub information 236 contains information about one or more device hubs 207 associated with the account. For instance, the user may supply security credentials in order to communicate with the device hub 207. The authentication service 215 may be configured to harvest associated LFD information 233 from the device hub 207 using the hub information 236.

The communication channels 239 correspond to various channels of communication that are associated with the account and are considered, at least to a certain extent, trusted. These communication channels 239 may include email addresses, voice interface devices 109, telephone numbers to receive text messages or phone calls, social networking accounts, and/or other channels. The communication channels 239 may be used to provide instructions with respect to use of limited-functionality networked devices 103 as authentication factors. In other scenarios, the communication channels 239 may be used to distribute and/or receive variable entropy security credentials that may be used as authentication factors. Techniques for distributing and/or receiving variable entropy security credentials are described in U.S. patent application Ser. No. 15/189,493, entitled "DISTRIBUTING VARIABLE ENTROPY EPHEMERAL SECURITY CREDENTIALS ACROSS CHANNELS OF VARIABLE ASSURANCE," and filed on Jun. 22, 2016, which is incorporated herein by reference in its entirety.

The security credentials 242 correspond to data for various authentication factors, including passwords and/or other shared secrets, public keys, answers to knowledge-based questions, and so forth. The authentication rules 230 specify how authentication is to be performed in response to a given authentication request for an account. Depending on the level of security assurance required and/or other factors indicating unusual or suspicious activity, one authentication factor or a combination of multiple authentication factors may be employed by the authentication service 215. For example, if the request originates from a device that has a network address associated with a country having a high rate of fraud, additional authentication factors may be required. As another example, a combination of multiple relative weak authentication factors may be employed if a relatively strong authentication factor is not available. In particular, the authentication rules 230 may control under what circumstances limited-functionality networked devices 103 are to be repurposed as authentication factors.

The LFD data 227 provides a variety of metadata about limited-functionality networked devices 103 and potentially other limited-functionality devices or objects. This metadata may be used by the authentication service 215 and/or the device management service 218. In some cases, the LFD data 227 may be divided, with portions accessible by the authentication service 215, portions accessible by the device management service 218, and portions accessible by both. The LFD data 227 may include data regarding location 245, cost 248, battery level 249, user friction 251, one or more functions 254, one or more predefined activation patterns 257, one or more normal consequences 260, and/or other data.

The location 245 may indicate a location of a respective limited-functionality networked device 103. This may be specified as a room, a room number, a suite, a building floor, coordinates in latitude/longitude, and so on. The location 245 may be specified manually by a user during enrollment of the limited-functionality networked device 103 or may be determined automatically (e.g., the device includes global positioning system (GPS) hardware or similar location determining hardware, or the user activates the device while near or interacting with another device having such location determining hardware or a known location).

The cost 248 corresponds to a cost of activating functions 254 of the limited-functionality networked device 103. For example, there may be a transaction cost assessed for repurposing the limited-functionality networked device 103 as an authentication factor. In some cases, the limited-functionality networked device 103 may have a limited number of potential uses before the device becomes disabled or is likely to break or stop working, and thus the cost 248 may correspond to the cost of the device divided by a maximum number of uses. In some scenarios, the device may include a non-replaceable, non-rechargeable battery. The cost 248 may depend on a battery cost and an expected number of uses per battery. The battery level 249 indicates a current battery level in the limited-functionality networked device 103, if applicable. Some limited-functionality networked devices 103 may be powered through wired or wireless power connections.

User friction 251 may measure a level of user frustration involved in activating a function of a limited-functionality networked device 103. If the device function is relatively simple to activate (e.g., pressing a button with a finger), the level of user friction 251 may be relatively low. By contrast, if the device function is challenging to activate (e.g., rotating a very small potentiometer that requires a precision screwdriver to turn, pressing a button on a ceiling-mounted smoke detector), the level of user friction 251 may be relatively high.

The functions 254 associated with a limited-functionality networked device 103 may include button presses, potentiometer adjustments, water activations, temperature activations, openings or closings of doors, toggle switch activations, electrical current draw levels, and/or other user input functions 254 that can be reported via the network 209. The predefined activation patterns 257 may describe a sequence of functions that when activated cause the limited-functionality networked device 103 to perform as an authentication factor. For instance, a device with a single button may have a predefined activation pattern 257 of two short button presses followed by two long button presses. This predefined activation pattern 257 may be set in advance by a user or may be communicated to a user via a communication channel 239. A predefined activation pattern 257, if different for each user, may correspond to a knowledge-based authentication factor that may be combined with the use of a limited-functionality networked device 103 as a possession-based authentication factor.

The normal consequences 260 correspond to one or more actions that may be normally initiated upon activation of one or more functions 254. Such actions are generally unconnected with using the limited-functionality networked device 103 as an authentication factor. For instance, the normal consequences 260 may include placing an order for an item, turning a light on or off, locking or unlocking a door, adjusting a thermostat temperature, turning a kitchen appliance on or off, and so forth.

The capture profile 261 may apply to limited-functionality devices or objects that are not networked. When users are directed to interact with such devices, the interaction can be captured via a capture device such as the client computing device 206 or the voice interface device 109. A history of such interactions may be established in the capture profile 261. For instance, the capture profile 261 may include all notes that can be played via a musical instrument, photos of all angles of a physical object, sounds that are expected to be emitted by a device, and/or other characteristics of a limited-functionality device or object that is not normally used for authentication but is possessed by or is accessible to a user.

The client computing device 206 is representative of a plurality of client devices that may be coupled to the network 209. The client computing device 206 performs general-purpose computing functions in contrast to the limited-functionality networked devices 103. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, or other devices. The client computing device 206 may include a display 263. The display 263 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 266 and/or other applications. The client application 266 may be executed in a client computing device 206, for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. The client computing device 206 may be configured to execute applications beyond the client application 266 such as, for example, email applications, social networking applications, word processors, spreadsheets, and/or other applications. The client computing device 206 may correspond to a capture device, with one or more input devices. The input devices may comprise a camera, a microphone, and/or other input devices.

The voice interface device 109 is representative of a plurality of voice devices that may be coupled to the network 209. The voice interface device 109 may comprise, for example, a processor-based system such as a computer system. The voice interface device includes one or more audio input devices 272 and one or more audio output devices 275. The audio input devices 272 may comprise a microphone, a microphone-level audio input, a line-level audio input, or other types of input devices. The audio output device 275 may comprise a speaker, a speaker output, a headphone output, a line-level audio output, or other types of output devices. In one embodiment, the voice interface device 109 includes at least one integrated microphone and at least one integrated speaker, within a single enclosure.

The voice interface device 109 may also include a speech synthesizer 278 and one or more client applications 281. The speech synthesizer 278 may be configured to transform text inputs into speech for one or more languages using one or more standard voice profiles. The client applications 281 may enable functionality such as personal assistant functionality, home automation functionality, television control functionality, music playback functionality, and/or other interactive functions. The client applications 281 may be configured to perform natural language processing and/or speech to text functions.

It is noted that voice recognition and processing functions may be divided among the computing environment 203 and the voice interface device 109. Thus, the authentication service 215 may be communication with an application implementing the server-side functionality of the voice interface device 109. The server-side functions of the voice interface device 109 may be on the same servers as the computing environment 203 if operated by the same entity or they may be on servers operated by a different entity.

Additional examples of a voice interface device 109 may be found in U.S. patent application Ser. No. 14/456,620, entitled "VOICE APPLICATION ARCHITECTURE," filed on Aug. 11, 2014, which was published as U.S. Patent Application Publication 2016/0042748 on Feb. 11, 2016; and in U.S. patent application Ser. No. 14/107,931, entitled "ATTRIBUTE-BASED AUDIO CHANNEL ARBITRATION," filed on Dec. 16, 2016, which was published as U.S. Patent Application Publication 2015/0170665 on Jun. 18, 2015. Both applications and their respective publications are incorporated herein by reference in their entirety.

The limited-functionality networked devices 103 correspond to special-purpose computing devices that are configured to support only limited computing functionality for purposes of ubiquity and/or reduced cost. Many of these limited-functionality networked devices 103 may be battery operated. Other examples of limited-functionality networked devices 103 are described in U.S. patent application Ser. No. 14/802,773, entitled "PRINTED MATERIAL WITH AN EMBEDDED ORDERING DEVICE," filed on Jul. 17, 2015, which is incorporated herein by reference in its entirety. Also, many of these limited-functionality networked devices 103 may be considered Internet of Things (IoT) devices. The Internet of Things (IoT) has been defined in Recommendation ITU-T Y.2060 (June 2012) (http://www.itu.int/ITU-T/recommendations/rec.aspx?rec=y.2060) as a global infrastructure for the information society, enabling advanced services by interconnecting (physical and virtual) things based on existing and evolving interoperable information and communication technologies.

Some of these limited-functionality networked devices 103 may be integrated into conventional devices (e.g., kitchen appliances, thermostats, light bulbs, light switches, smoke detectors, etc.) that traditionally did not support networked computing. In some embodiments, the limited-functionality networked devices 103 may include general-purpose processors programmed for use along with other limited hardware. In particular, user input and output devices may be limited. Typical user input and output devices like mice, keyboards, touchscreens, and so on, may be absent from, or not embedded within or integral with, the limited-functionality networked devices 103. The limited-functionality networked devices 103 may communicate output via a limited LCD display, a voice interface, LED or other lighted indicators, and so on, or via a network 209 to another device.

The limited-functionality networked devices 103 may correspond to any item (e.g., appliance, light switch, sensor) that has an addressable interface (e.g., Internet protocol (IP) address, BLUETOOTH identifier (ID), near-field communication (NFC) ID) and can transmit information to one or more other devices over a wired or wireless connection. Such a device may have a passive communication interface, such as a quick response (QR) code, a radio-frequency identification (RFID) tag, or an NFC tag, or an active communication interface, such as a modem, a transceiver, or a transmitter-receiver. The limited-functionality networked devices 103 can have a particular set of attributes (e.g., a device state or status, such as whether the limited-functionality networked device 103 is on or off, open or closed, idle or active, available for task execution or busy, a cooling or heating function, an environmental monitoring or recording function, a light-emitting function, or a sound-emitting function) that can be embedded in and/or controlled/monitored by a central processing unit (CPU), microprocessor, or application-specific integrated circuit (ASIC), and configured to connect to a network, such as a local ad-hoc network or the Internet. For example, the limited-functionality networked devices 103 may include, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, magazines, and books, so long as the devices are equipped with an addressable communications interface for communicating with the network 209. Thus, the limited-functionality networked devices 103 may include devices that do not typically have Internet-connectivity (e.g., dishwashers).

The device hub 207 may facilitate communication among limited-functionality networked devices 103. In particular, the limited-functionality networked devices 103 may be of relatively low power and/or use peer-to-peer network protocols for mesh networking, thus necessitating a special device hub 207 that may be distinct from other networking gateways for the client computing devices 206. The device hub 207 may configure various environmental operation schemes, such as home or office automation. The device hub 207 may communicate with the device management service 218 to facilitate device management, remote access, notification and alarms, and to provide status information.

Figure 3A:
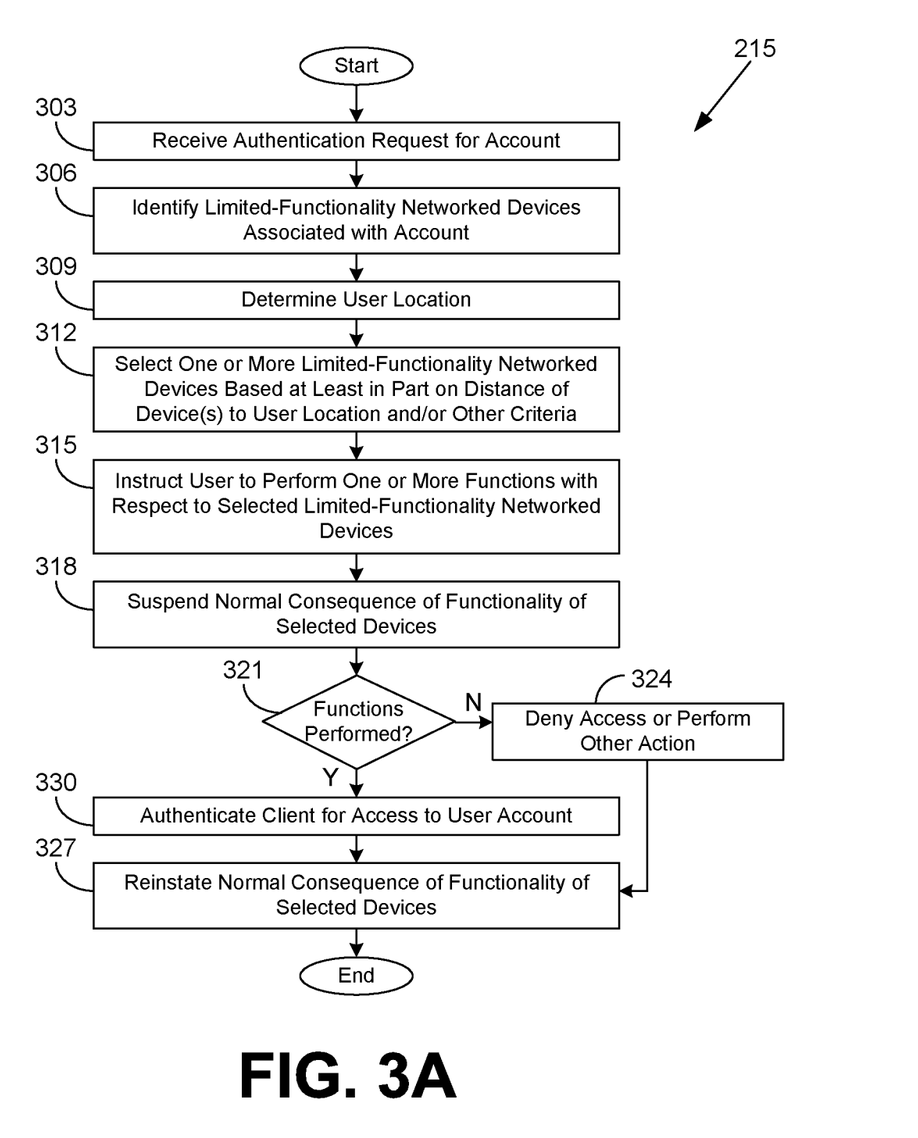
FIGS. 3A and 3B are flowcharts illustrating examples of functionality implemented as portions of an authentication service executed in a computing environment in the networked environment of FIG. 2 according to various embodiments of the present disclosure.

Referring next to FIG. 3A, shown is a flowchart that provides one example of the operation of a portion of the authentication service 215 according to various embodiments. It is understood that the flowchart of FIG. 3A provides merely an example of the many different types of functional arrangements that may be employed to implement the operation of the portion of the authentication service 215 as described herein. As an alternative, the flowchart of FIG. 3A may be viewed as depicting an example of elements of a method implemented in the computing environment 203 (FIG. 2) according to one or more embodiments.

Beginning with box 303, the authentication service 215 receives an authentication request for accessing one or more resources associated with an account. For example, a user may use a client application 266 (FIG. 2) on a client computing device 206 (FIG. 2) to navigate to a network page associated with logging into the account, and then enter a username and password. Alternatively, the user may speak a voice command into the voice interface device 109 (FIG. 2), where the voice command requires authentication of the user in order to be carried out.

In box 306, the authentication service 215 identifies one or more limited-functionality networked devices 103 (FIG. 2) associated with the account from the associated LFD information 233 (FIG. 2). As part of identifying the limited-functionality networked devices 103, the authentication service 215 may perform an automated discovery process relative to a device hub 207 (FIG. 2) that was previously associated with the account using the hub information 236 (FIG. 2). Alternatively, the authentication service 215 may determine limited-functionality networked devices 103 that are manually associated with the account by an authenticated user.

In box 309, the authentication service 215 may determine a user location. For example, if the user employs a client computing device 206 to send the authentication request, the authentication service 215 may determine the location of the client computing device 206, as reported via a GPS or similar device, triangulation using wireless access points or cell towers, network address geolocation, and/or other approaches. Alternatively, the user may interact with the voice interface device 109 or some other device that has a known location (e.g., a living room at home).

In box 312, the authentication service 215 selects one or more limited-functionality networked devices 103 using authentication rules 230 (FIG. 2) based at least in part on a distance of the respective device to the user location and/or other criteria. For example, the authentication service 215 may compare the location 245 (FIG. 2) of the limited-functionality networked device 103 to see whether it is the closest or relatively close to the user location determined in box 309. The distance may be computed using geographic distance between coordinates in some scenarios. In other scenarios, the distance may correspond to determining whether the device and the user location are in the same room, as the location 245 may be specified in terms of a user-defined label such as "kitchen." If the user is determined to be traveling, a limited-functionality networked device 103 that is located in the user's vehicle may be selected.

Other criteria that may be considered may include cost 248 (FIG. 2), where lower-cost limited-functionality networked devices 103 may be favored, battery level 249 (FIG. 2), where limited-functionality networked devices 103 having a charge meeting a predefined threshold are considered or where battery usage is sought to be uniformly distributed among the limited-functionality networked devices 103, user friction 251 (FIG. 2), where limited-functionality networked devices 103 having a lesser level of user friction 251 (FIG. 2) are preferred, whether a predefined activation pattern 257 (FIG. 2) of a threshold complexity is defined, whether the normal consequence 260 (FIG. 2) is problematic or can easily be avoided, and/or other factors.

In addition, the authentication service 215 may employ other authentication factors in addition to limited-functionality networked devices 103 (e.g., passwords, knowledge-based questions, biometrics), and the relative strength or entropy of these various factors may be considered. Further, characteristics of the authentication request may be considered (e.g., network address, identity of the originating client computing device 206, resources sought, and/or other characteristics), where the characteristics may tend to indicate risk of a malicious actor being involved. A weighted combination of the various criteria may be employed in order to select one or more of the limited-functionality networked devices 103 as authentication factors. In some cases, authentication with a greater number of limited-functionality networked devices 103 may be preferred to increase security assurance.

In box 315, the authentication service 215 causes an instruction to be presented to the user via a communication channel 239 (FIG. 2) instructing the user to perform one or more functions 254 (FIG. 2) with respect to the selected limited-functionality networked devices 103. For example, a client application 266 may render a user interface 269 (FIG. 2) prompting the user to open a refrigerator door, where the refrigerator is a limited-functionality networked device 103. As another example, the voice interface device 109 may request that the user turn on and off the master bedroom light three times. As yet another example, an email may be sent to an associated email address of the account instructing the user to adjust the thermostat to 60 degrees, to open the oven door, and to press a button on a device that reorders laundry detergent.

Although instructions may be provided, no instructions may be provided in other scenarios. For example, the user may have previously configured a predefined activation pattern 257 of pressing a device that reorders peanut butter three times as an authentication factor. In some cases, this predefined activation pattern 257 may itself be the initial authentication request for authorization to be given to another device.

In box 318, the authentication service 215 may suspend or temporarily disable a normal consequence 260 of the selected limited-functionality networked devices 103. For instance, where a button normally starts a wash cycle on a smart clothes washing machine, the button can be reprogrammed in order not to actually start the cycle. To carry this out, the authentication service 215 may send a directive to the device management service 218 (FIG. 2) to reconfigure the particular limited-functionality networked device 103 not to perform the action. Alternatively, the device management service 218 may be directed not to carry out an expected action server-side.

In box 321, the authentication service 215 determines whether the expected sequence of one or more functions 254 have been performed relative to the selected limited-functionality networked devices 103. In this regard, the authentication service 215 may communicate with the device management service 218 to receive a notification of the functions 254 being performed. For instance, an event may be generated by the limited-functionality networked device 103 and sent to the device management service 218 via the network 209. The event can then be passed on, and possibly aggregated and/or translated, to the authentication service 215.

Alternatively, the authentication service 215 and/or the device management service 218 may poll a status of the limited-functionality networked devices 103. In some embodiments, this status information may be available from the device hub 207, when a device hub 207 is employed. For example, the status may indicate that a light is currently on or that the light is currently off, or similarly, the current temperature setting of a thermostat.

If one or more of the required sequence of functions 254 is not performed, or is performed out of order, the authentication service 215 moves from box 321 to box 324 and denies access to the resource of the user account or performs other actions. In some cases, performing fewer than all of the sequence of functions may cause a sufficient confidence score meeting a threshold to be generated, which thereby allows authentication. Further, in some cases, failure to meet a specific challenge may be responded to with another challenge, e.g., another function 254 to perform relative to one or more other limited-functionality networked devices 103. In other examples, a notification to an administrator may be sent, identifying information may be logged, or other actions may be performed.

In box 327, the authentication service 215 proceeds to reinstate a normal consequence 260 of the selected limited-functionality networked devices 103. Alternatively, the limited-functionality networked devices 103 may reverse a normal consequence 260 that has been activated purely for authentication purposes (e.g., cancelling an order for an item that has been placed, changing the thermostat back to a previous set point, and so on). In some cases, the normal consequence 260 is not deemed meaningful (e.g., whether a light is turned on or off, that a refrigerator door has been opened), and there is no need to suspend, disable, or reverse the normal consequence 260. Thereafter, the operation of the portion of the authentication service 215 ends.

If the sequence of functions 254 has been performed, the authentication service 215 instead moves from box 321 to box 330 and authenticates a client computing device 206 and/or a voice interface device 109 for access to resources of the account. Next, in box 327, the authentication service 215 proceeds to reinstate or reverse a normal consequence 260 of the selected limited-functionality networked devices 103. Thereafter, the operation of the portion of the authentication service 215 ends.

Figure 3B:
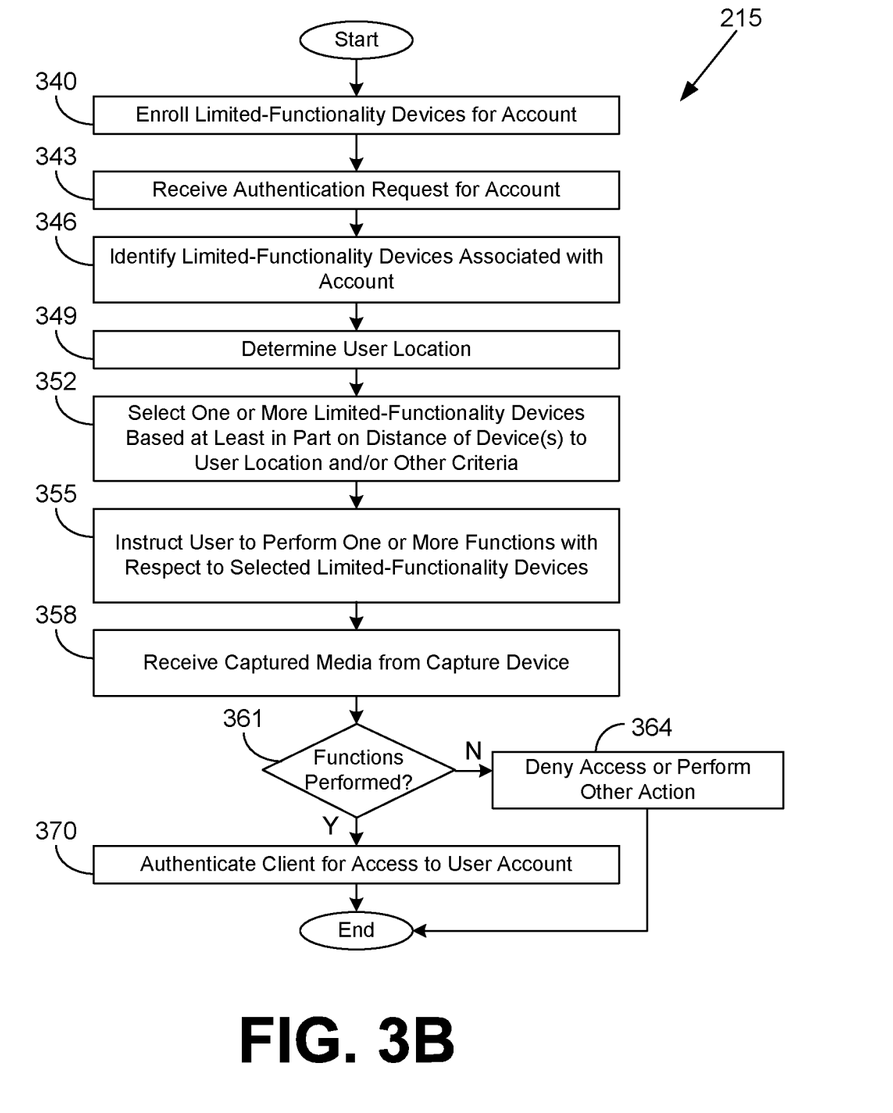

Turning now to FIG. 3B, shown is a flowchart that provides another example of the operation of a portion of the authentication service 215 according to various embodiments. It is understood that the flowchart of FIG. 3B provides merely an example of the many different types of functional arrangements that may be employed to implement the operation of the portion of the authentication service 215 as described herein. As an alternative, the flowchart of FIG. 3B may be viewed as depicting an example of elements of a method implemented in the computing environment 203 (FIG. 2) according to one or more embodiments.

Beginning with box 430, the authentication service 215 enrolls one or more limited-functionality devices or objects as being associated with a user account. An authenticated user may be directed to interact with the limited-functionality devices or objects by activating various functions while the interaction is being captured by a capture device, such as a client computing device 206 (FIG. 2) or a voice interface device 109 (FIG. 2). In this way, a capture profile 261 (FIG. 2) may be established for the limited-functionality devices or objects. For example, a user may be directed to play each note on a keyboard of a piano so that the unique character of the piano can be profiled. As another example, the user may be directed to hold up a physical object in his or her home and rotate it in front of a camera. In this way, a model of the object can be created for the capture profile 261.

Next, in box 343, the authentication service 215 receives an authentication request for accessing one or more resources associated with an account. For example, a user may use a client application 266 (FIG. 2) on a client computing device 206 to navigate to a network page associated with logging into the account, and then enter a username and password. Alternatively, the user may speak a voice command into the voice interface device 109 where the voice command requires authentication of the user in order to be carried out.

In box 346, the authentication service 215 identifies one or more limited-functionality devices 103 (FIG. 2) associated with the account from the associated LFD information 233 (FIG. 2). In box 349, the authentication service 215 may determine a user location. For example, if the user employs a client computing device 206 to send the authentication request, the authentication service 215 may determine the location of the client computing device 206, as reported via a GPS or similar device, triangulation using wireless access points or cell towers, network address geolocation, and/or other approaches. Alternatively, the user may interact with the voice interface device 109 or some other device that has a known location (e.g., a living room at home).

In box 352, the authentication service 215 selects one or more limited-functionality devices using authentication rules 230 (FIG. 2) based at least in part on a distance of the respective device to the user location and/or other criteria. For example, the authentication service 215 may compare the location 245 (FIG. 2) of the limited-functionality device to see whether it is the closest or relatively close to the user location determined in box 309. The distance may be computed using geographic distance between coordinates in some scenarios. In other scenarios, the distance may correspond to determining whether the device and the user location are in the same room, as the location 245 may be specified in terms of a user-defined label such as "kitchen." If the user is determined to be traveling, a limited-functionality device that is located in the user's vehicle may be selected.

Other criteria that may be considered may include cost 248 (FIG. 2), where lower-cost limited-functionality devices may be favored, battery level 249 (FIG. 2), where limited-functionality devices having a charge meeting a predefined threshold are considered or where battery usage is sought to be uniformly distributed among the limited-functionality devices, user friction 251 (FIG. 2), where limited-functionality devices having a lesser level of user friction 251 (FIG. 2) are preferred, whether a predefined activation pattern 257 (FIG. 2) of a threshold complexity is defined, and/or other factors.

In addition, the authentication service 215 may employ other authentication factors in addition to limited-functionality devices (e.g., passwords, knowledge-based questions, biometrics), and the relative strength or entropy of these various factors may be considered. Further, characteristics of the authentication request may be considered (e.g., network address, identity of the originating client computing device 206, resources sought, and/or other characteristics), where the characteristics may tend to indicate risk of a malicious actor being involved. A weighted combination of the various criteria may be employed in order to select one or more of the limited-functionality devices as authentication factors. In some cases, authentication with a greater number of limited-functionality devices may be preferred to increase security assurance.

In box 355, the authentication service 215 causes an instruction to be presented to the user via a communication channel 239 (FIG. 2) instructing the user to perform one or more functions 254 (FIG. 2) with respect to the selected limited-functionality devices to be captured by a capture device. For example, a user may be instructed to play specific notes via a particular musical instrument, or the user may be directed to show a physical object to a camera.

Although instructions may be provided, no instructions may be provided in other scenarios. For example, the user may have previously configured a predefined activation pattern 257 of playing certain piano notes as an authentication factor. In some cases, this predefined activation pattern 257 may itself be the initial authentication request for authorization to be given to another device.

In box 358, the authentication service 215 receives captured media (e.g., images, video, audio, etc.) from the capture device via the network 209. In box 361, the authentication service 215 analyzes the captured media to determine whether the expected sequence of one or more functions 254 have been performed relative to the selected limited-functionality devices. For example, the authentication service 215 may compare musical notes in captured audio with reference samples stored in the capture profile 261. Alternatively, the authentication service 215 may compare a sound made by an object in the captured audio with reference samples stored in the capture profile 261. Also, the authentication service 215 may compare captured video of an object with reference images stored in the capture profile 261.

If one or more of the required sequence of functions 254 is not performed, or is performed out of order, the authentication service 215 moves from box 361 to box 364 and denies access to the resource of the user account or performs other actions. In some cases, performing fewer than all of the sequence of functions may cause a sufficient confidence score meeting a threshold to be generated, which thereby allows authentication. Further, in some cases, failure to meet a specific challenge may be responded to with another challenge, e.g., another function 254 to perform relative to one or more other limited-functionality devices. In other examples, a notification to an administrator may be sent, identifying information may be logged, or other actions may be performed. Thereafter, the operation of the portion of the authentication service 215 ends.

If the sequence of functions 254 has been performed, the authentication service 215 instead moves from box 361 to box 370 and authenticates a client computing device 206 and/or a voice interface device 109 for access to resources of the account. Thereafter, the operation of the portion of the authentication service 215 ends.

Figure 4:
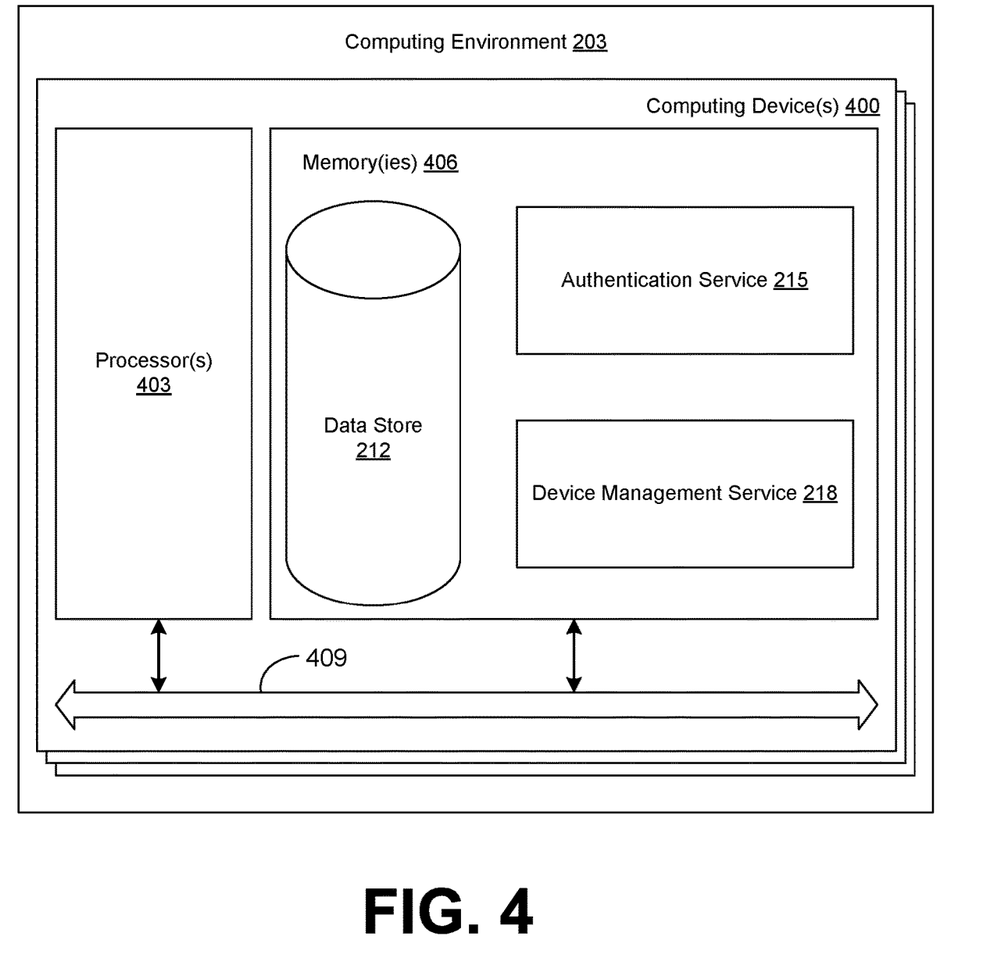
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the authentication service 215, the device management service 218, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the authentication service 215, the device management service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the authentication service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 215 or the device management service 218, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 215 or the device management service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
receive an authentication request for an account from a client device via a network;
select a particular limited-functionality networked device from a plurality of limited-functionality networked devices associated with the account according to one or more criteria, wherein the plurality of limited-functionality networked devices are configured to perform a function other than authenticating a user with a network service;
cause a voice instruction to be presented to the user via a speaker of the client device, the voice instruction instructing the user to perform a sequence of functions with respect to the particular limited-functionality networked device;
prevent a realization of a normal consequence of the sequence of functions with respect to the particular limited-functionality networked device;
determine that the sequence of functions has been performed by the user with respect to the particular limited-functionality networked device; and
authenticate the client device for access to the account based at least in part on the sequence of functions having been performed.

2. The non-transitory computer-readable medium of claim 1, wherein the voice instruction instructs the user to activate a button of the particular limited-functionality networked device, and a single activation of the button normally causes the particular limited-functionality networked device to place an order for an item.

3. The non-transitory computer-readable medium of claim 1, wherein the particular limited-functionality networked device has an addressable interface and is configured to transmit to one or more other devices over a wired or wireless network connection, and the particular limited-functionality networked device comprises at least one of: a kitchen appliance, a thermostat, a light switch, an electrical receptacle, or an item ordering device.

4. A system, comprising:
at least one computing device; and
an authentication service executable in the at least one computing device, wherein when executed the authentication service causes the at least one computing device to at least:
identify a limited-functionality networked device associated with an account and communicatively coupled to a network, wherein the limited-functionality networked device is configured to perform a first function upon a predefined user interaction;
configure the limited-functionality networked device to perform a second function based at least in part on the predefined user interaction;
prevent a realization of a normal consequence of the first function upon the predefined user interaction with the limited-functionality networked device;
determine that the predefined user interaction has been performed by a user with respect to the limited-functionality networked device; and
authenticate the user at a client device for access to the account based at least in part on the predefined user interaction having been performed.

5. The system of claim 4, wherein the limited-functionality networked device is identified in response to an authentication request received from the client device via the network.

6. The system of claim 4, wherein the user at the client device is authenticated further based at least in part on receiving at least one other valid authentication factor from the client device or at least one other client device.

7. The system of claim 4, wherein determining that the predefined user interaction has been performed by the user with respect to the limited-functionality networked device further comprises determining that a predefined pattern of user interactions has been performed by the user with respect to the limited-functionality networked device and at least one other limited-functionality networked device, and the client device is authenticated further based at least in part on the predefined pattern of user interactions having been performed.

8. The system of claim 4, wherein determining that the predefined user interaction has been performed by the user with respect to the limited-functionality networked device further comprises determining that a predefined pattern of instances of the predefined user interaction has been performed by the user with respect to the limited-functionality networked device, and the client device is authenticated further based at least in part on the predefined pattern of instances of the predefined user interaction having been performed.

9. The system of claim 4, wherein when executed the authentication service further causes the at least one computing device to at least cause an instruction to be presented to the user to perform the predefined user interaction with respect to the limited-functionality networked device.

10. The system of claim 9, wherein the instruction is presented to the user via the client device.

11. The system of claim 9, wherein the client device comprises a first client device, and the instruction is presented to the user via a second client device.

12. The system of claim 4, wherein preventing the realization of the normal consequence of the first function further comprises suspending or reversing the normal consequence of the first function.

13. The system of claim 4, wherein when executed the authentication service further causes the at least one computing device to at least cause a feedback signal to be presented via the limited-functionality networked device in response to authenticating the client device.

14. The system of claim 4, wherein the limited-functionality networked device is configured to report via the network that the predefined user interaction has been performed.

15. A method, comprising:
receiving, via at least one of one or more computing devices, an authentication request for an account;
identifying, via at least one of the one or more computing devices, a limited-functionality networked device associated with the account;
preventing, via at least one of the one or more computing devices, a realization of a normal consequence of a function that is performable through a user interaction with the limited-functionality networked device; and
authenticating, via at least one of the one or more computing devices, a client for access to the account based at least in part on the function being performed.

16. The method of claim 15, further comprising causing, via at least one of the one or more computing devices, an instruction to be presented, via the client or another client, to perform the function through the user interaction with the limited-functionality networked device.

17. The method of claim 15, wherein identifying the limited-functionality networked device further comprises selecting, via at least one of the one or more computing devices, the limited-functionality networked device from a plurality of limited-functionality networked devices associated with the account based at least in part on a distance of the limited-functionality networked device to a user location.

18. The method of claim 15, wherein identifying the limited-functionality networked device further comprises selecting, via at least one of the one or more computing devices, the limited-functionality networked device from a plurality of limited-functionality networked devices associated with the account based at least in part on a battery level of the limited-functionality networked device.

19. The method of claim 15, further comprising:
authenticating, via at least one of the one or more computing devices, with a device hub using at least one credential supplied by an authenticated user of the account; and
automatically discovering, via at least one of the one or more computing devices, the limited-functionality networked device via the device hub.

20. The method of claim 15, wherein the normal consequence of the function is a placement of an order for an item.

* * * * *